United States Patent [19]

Feldman et al.

[11] 3,796,945

[45] Mar. 12, 1974

[54] DIGITAL ATTENUATOR WHEREIN TRANSISTOR SWITCH MEANS ARE BIASED BY RECTIFIER CIRCUIT

[75] Inventors: Stanley Feldman, Evanston; William J. Mellenthin, Arlington Heights, both of Ill.

[73] Assignee: Beltone Electronics Corporation, Chicago, Ill.

[22] Filed: May 15, 1973

[21] Appl. No.: 360,555

[52] U.S. Cl. ...................... 323/74, 179/1 N, 323/80, 323/81, 323/94 R

[51] Int. Cl. ......................... H01p 1/22, H04r 29/00

[58] Field of Search ......... 323/74, 79, 80, 81, 94 R, 323/95, 96; 179/1 N; 333/81 R, 80 R, 80 T

[56] References Cited

UNITED STATES PATENTS

| | | | |
|---|---|---|---|
| 2,471,136 | 5/1949 | Allison | 179/1 N |
| 2,999,202 | 9/1961 | Ule | 323/74 |
| 3,011,132 | 11/1961 | Hinrichs | 323/79 X |
| 3,590,366 | 6/1971 | Vaughn | 323/74 |

*Primary Examiner*—Gerald Goldberg

*Attorney, Agent, or Firm*—Molinare, Allegretti, Newitt & Witcoff

[57] ABSTRACT

The disclosure describes a digital attenuator having non-isolated, L-type attenuator sections. The sections comprise shunt legs that are switched to ground potential by bipolar NPN transistors. An adder circuit and a decoder circuit provide switching signals that enable predetermined attenuator sections through PNP transistors that are connected to the NPN transistors. A rectifier circuit produces a half-wave signal that biases the NPN transistors during their off state to prevent audio signals having a large magnitude from switching on the NPN transistors.

9 Claims, 3 Drawing Figures

DIGITAL ATTENUATOR WHEREIN TRANSISTOR SWITCH MEANS ARE BIASED BY RECTIFIER CIRCUIT

BACKGROUND AND SUMMARY OF THE INVENTION

This invention relates to digital attenuators and more particularly relates to attenuators for use in audiometers.

Audiometers are devices for measuring the accuracy of human hearing. In order to test human hearing, the audiometers must create sound pressure waves having a magnitude that can be controlled to within one decibel (db) over a large range of attenuation up to about 130 db. By using conventional potentiometer-type attenuators, it is difficult to maintain accuracy and linearity over this range, particularly at large values of attenuation. In addition, such attenuators tend to transmit extraneous noise, such as scratching sounds, to the head phones used by a patient during an audiometer test. Since the human ear is very sensitive, any acoustic noise, such as clicking sounds resulting from the operation of an audiometer, may upset the measurement of the patient's hearing ability.

Accordingly, it is a principal object of the present invention to provide an attenuator capable of producing predetermined discrete increments of attenuation over a large range of attenuation.

It is another object of the present invention to provide such an attenuator in which extraneous noise and clicking sounds are eliminated.

Still another object of the present invention is to provide an attenuator of the foregoing type in which an audio signal is rectified in order to bias a switching circuit connected to various attenuator sections so that audio signals of large magnitude do not tend to enable an attenuator section which is intended to be disabled.

DESCRIPTION OF THE DRAWINGS

These and other objects, advantages and features of the present invention will hereinafter appear in connection with the accompanying drawings in which.

DESCRIPTION OF THE PREFERRED EMBODIMENT

Figure 1:
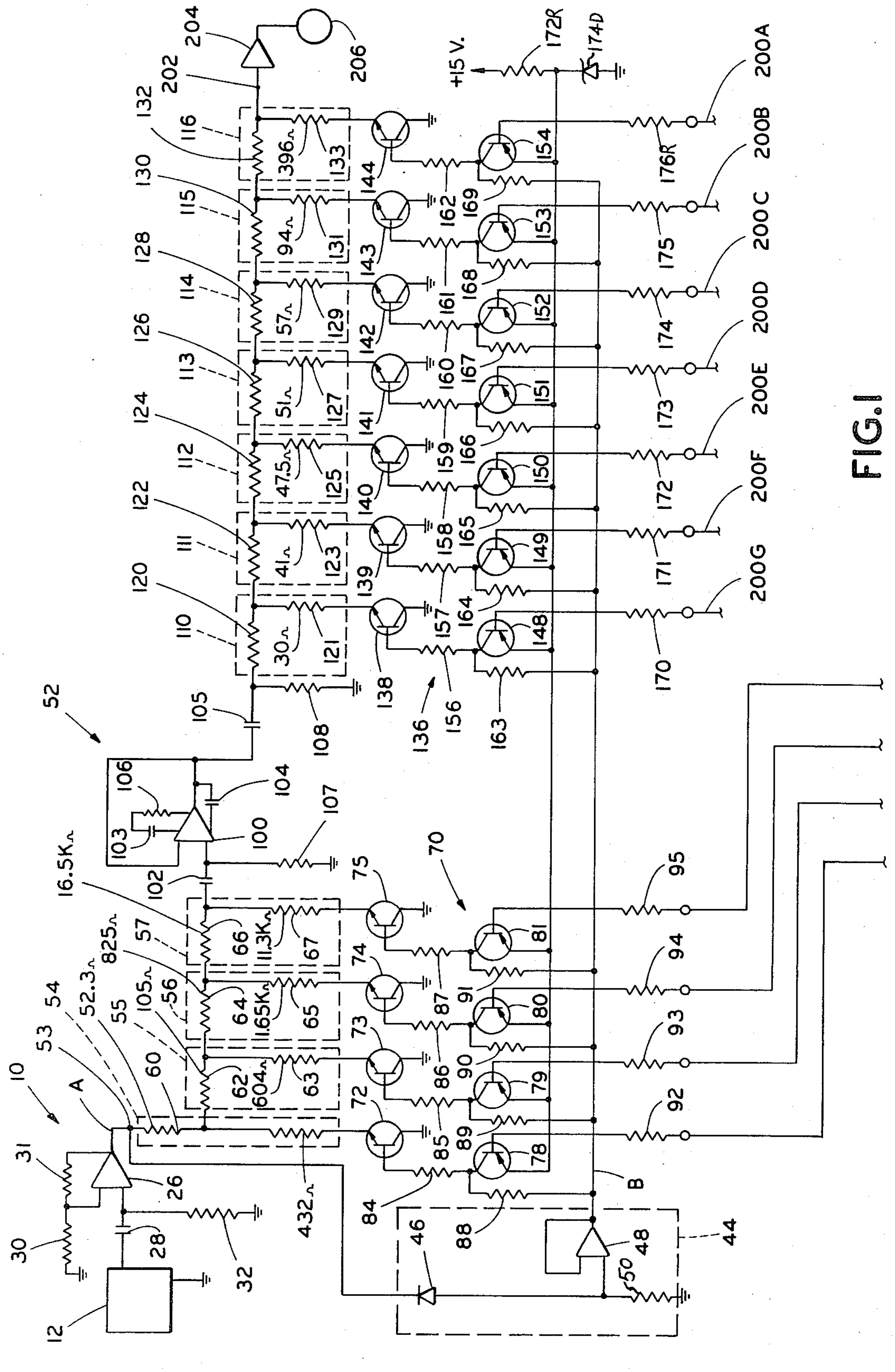
FIG. 1 is an electrical schematic diagram showing a preferred embodiment of a digital attenuator made in accordance with the invention.
Figure 2:
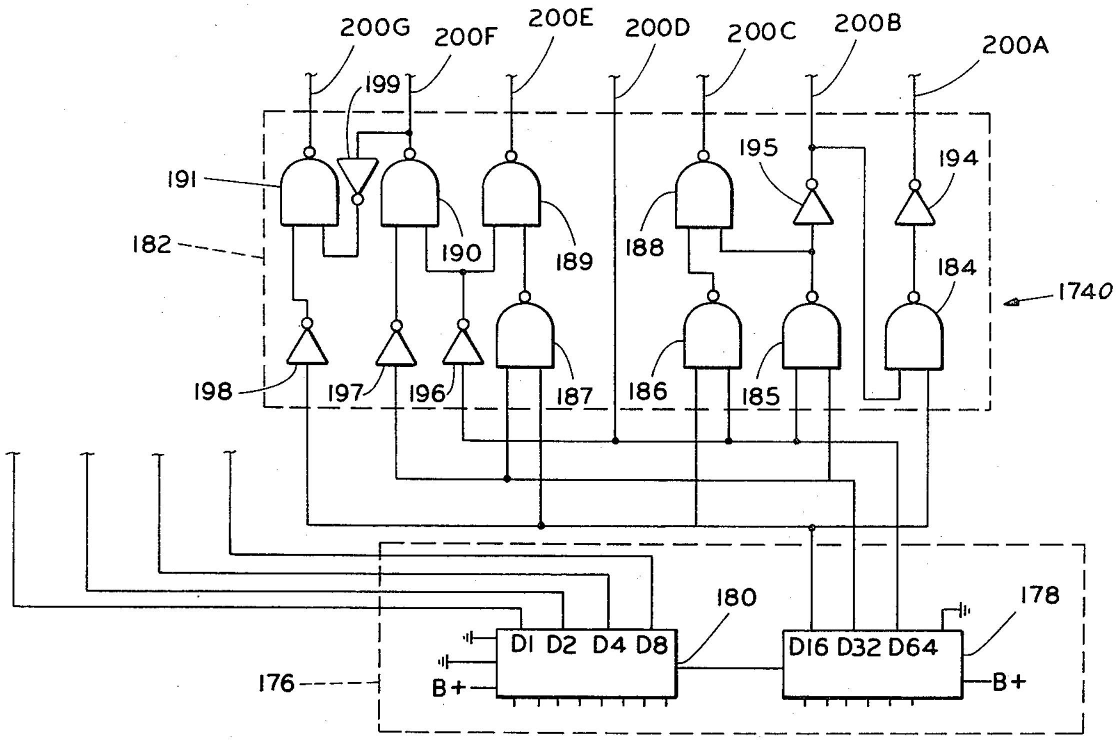
FIG. 2 is an electrical schematic diagram showing a preferred embodiment of an operating circuit for use with the attenuator.

As shown in FIGS. 1 and 2, a preferred form of digital attenuator made in accordance with the present invention basically comprises a generator circuit 10, a rectifying circuit 44, an attenuator network 52, and an operating circuit 1740.

Figure 3:
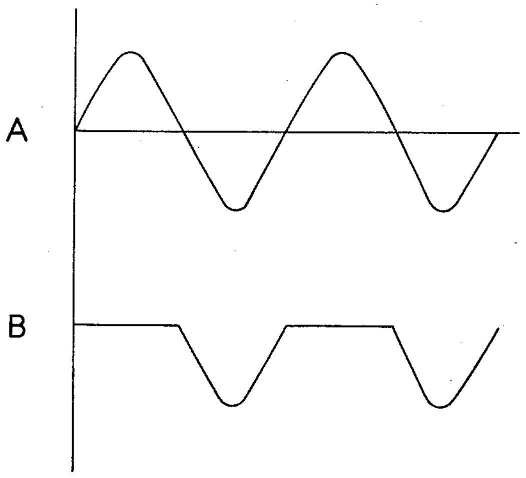
FIG. 3 illustrates voltage waveforms generated at the like-lettered portions of FIG. 1.

More particularly, generating circuit 10 comprises a conventional audio signal generator 12 and an operational isolating amplifier 26 that is controlled by a capacitor 28 and by resistors 30–32. Circuit 10 generates a sine wave voltage, such as waveform A of FIG. 3.

Rectifying circuit 44 comprises a germanium diode 46 and a non-inverting, impedance-matching amplifier 48 having an input grounded through a resistor 50. Circuit 44 applies the negative half of the sine wave signal appearing at the output of amplifier 26 to a switching circuit described hereafter. The half sine wave signal generated by circuit 44 is illustrated by waveform B, FIG. 3.

Attenuator network 52 comprises an input terminal 53 and non-isolated, L-type attenuator sections 54–57 that comprise resistors 60–67 having the values indicated on the drawings in ohms. When they are enabled, sections 54–57 attenuate the sinusoidal input signal received at terminal 53 by 1db, 2db, 4db, and 8db, respectively, so that a total of 15db of attenuation in 1db increments is possible.

Attenuator sections 54–57 are operated by a switching circuit 70 comprising NPN transistors 72–75 and PNP transistors 78–81. The transistors are biased by resistors 84–95 connected as shown.

An isolating amplifier 100 controlled by capacitors 102–105 and resistors 106–108 separates attenuator sections 54–57 from non-isolated L-type attenuator sections 110–116.

Attenuator sections 110–116 comprise resistors 120–133 connected as shown. Resistors 120, 122, 124, 126, 128, 130 and 132 each have a value of 300 ohms. Resistors 121, 123, 125, 127, 129, 131 and 133 have the values shown on the drawing in ohms. Each of sections 110–116 attenuates the sinusoidal input signal by 16 db so that a total of seven times 16, or 112 db of attenuation is possible. However, to achieve this result, the sections must be enabled in the following order: 116, 115, 114, 113, 112, 111, 110. By combining attenuator sections 54–57 with sections 110–116, 127 db of attenuation can be achieved in 1 db increments.

Attenuator sections 110–116 are controlled by a switching circuit 136 comprising NPN transistors 138–144 and PNP transistors 148–154. The transistors are biased by resistors 156–176R. The voltage applied to the emitters of transistors 78–81 and 148–154 is controlled by a 3.9 volt Zener diode 174D that is biased by a resistor 172R from a 15 volt source.

Referring to FIG. 2, operating circuit 1740 comprises an adder 176 and a decoder circuit 182. Adder 176 comprises adder chips 178 and 180, such as type 7483 manufactured by Motorola Corp. Outputs D1, D2, D4 and D8 of adder chip 180 are connected to resistors 92, 93, 94 and 95, respectively. Output terminals D16, D32 and D64 of adder chip 178 are connected to decoder circuit 182 which comprises NAND gates 184–191 and inverters 194–199. Circuit 182 is connected to the attenuator by conductors 200A–200G.

One important feature of the attenuator is that no active isolation is used between attenuator sections 110–116. The reason for this feature is that any active device used for isolation has a DC offset voltage which is dependent on the load impedance connected to the input of the active device. In such a system, if the attenuation were changed, the active device would produce a change in DC level which would be audible in an ear phone connected at the output.

It should also be noticed that resistor values are kept low in attenuator sections 110–116. This feature necessitates the use of switching transistors 138–144 which have a low saturation resistance. Transistors having a reasonably high beta and 1 milliamp base drive circuits accomplish this purpose. In addition, the offset voltages across these transistors are maintained at a minimum.

The output of attenuator section 116 is connected through an output terminal 202 and an output amplifier 204 to a transducer 206 which converts the attenuated sinusoidal signal into a corresponding sound pressure wave.

The apparatus operates as follows. Digital numbers are transmitted to adder 176 from control circuitry not shown. One form of control circuitry which can be utilized for this purpose is described in our co-pending patent application Ser. No. 360,554 entitled "Digital Audiometry Apparatus and Method", filed with this application. The digital number appearing on the adder outputs is capable of enabling any of the attenuator sections 54–57 or 110–116, so that 127 db of attenuation may be achieved in 1 db increments. For example, output D1 may be switched to its 0 state so that transistors 78 and 72 are switched to their ON states, and inverter 194 may be switched to its 0 state, so that transistors 144 and 154 are switched to their ON states. As a result, attenuator sections 54 and 116 are enabled to attenuate sinusoidal signal A (FIG. 3) by 17 db. At the same time, the rectified half sine wave signal B appearing at the output of amplifier 48 is shunted to ground potential through the collector-emitter junctions of transistors 78, 154 and through Zener diode 174D which forms a low impedance circuit. However, the half sine wave signal is applied to the base elements of transistors 73–75 and 138–143 so that these transistors remain biased in their OFF states irrespective of the magnitude of the sinusoidal input signal A. During the transition from the OFF to the ON states of transistors 72 and 144, only a minute change in DC level is generated. This DC level is inaudible below the relatively higher magnitude of sinusoidal input signal A.

Those skilled in the art will recognize that only a single preferred embodiment of the invention has been disclosed herein and that the preferred embodiment may be altered and amended without departing from the true spirit and scope of the invention as defined in the accompanying claims.

What is claimed is:

1. A digital attenuator for attenuating an audio signal comprising:

an input terminal for receiving the audio signal;

an output terminal for transmitting the audio signal to a load circuit;

first attenuator means for attenuating the audio signal by a discrete predetermined magnitude;

second attenuator means for attenuating the audio signal by a discrete predetermined magnitude;

conductor means for connecting the first and second attenuator means between the input terminal and the output terminal;

operating means for generating a first switching signal that enables the first attenuator means and for generating a second switching signal that enables the second attenuator means;

first switching means having a first output circuit operatively connected to the first attenuator means and having a first input circuit operatively connected to the operating means for enabling the first attenuator means in response to the first switching signal;

second switching means having a second output circuit operatively connected to the second attenuator means and having a second input circuit operatively connected to the operating means for enabling the second attenuator means in response to the second switching signal; and rectifier means for rectifying said audio signal to produce a half-wave signal and for transmitting the half-wave signal to the first and second input circuits so that an input signal of large magnitude is incapable of enabling said first attenuator means in the absence of said first switching signal and is incapable of enabling said second attenuator means in the absence of said second switching signal.

2. An attenuator, as claimed in claim 1, wherein the first attenuator means comprises:

a first series resistor connected in series between the input terminal and the output terminal; and a first shunt resistor connected between the first series resistor and the first output circuit.

3. An attenuator, as claimed in claim 2, wherein the second attenuator means comprises:

a second series resistor connected in series between the input terminal and the output terminal; and a second shunt resistor connected between the second series resistor and the second output circuit.

4. An attenuator, as claimed in claim 1, wherein the operating means comprises:

an electronic adder circuit; and a decoder circuit connected between the adder circuit and the first and second switching means.

5. An attenuator, as claimed in claim 4, wherein the operating means further comprises:

third switching means having a third output circuit connected to the first input circuit, a third input circuit connected to the decoder circuit and a fourth input circuit connected to a low impedance circuit;

fourth switching means having a fourth output circuit connected to the second input circuit, a fifth input circuit connected to the decoder circuit and a sixth input circuit connected to the low impedance circuit; and bias means for biasing the third and fifth input circuits so that the half-wave signal is shunted to the low impedance circuit during said switching signals.

6. An attenuator, as claimed in claim 5, wherein the third switching means comprises a first PNP transistor, wherein the third output circuit comprises a collector element of the first PNP transistor, wherein the third input circuit comprises a base element of the first PNP transistor and wherein the fourth input circuit comprises an emitter element of the first PNP transistor.

7. An attenuator, as claimed in claim 6, wherein the fourth switching means comprises a second PNP transistor, wherein the fourth output circuit comprises a collector element of the second PNP transistor, wherein the fifth input circuit comprises a base element of the second PNP transistor and wherein the sixth input circuit comprises an emitter element of the second PNP transistor.

8. An attenuator, as claimed in claim 7, wherein the first switching means comprises a first NPN transistor, wherein the first output circuit comprises an emitter element of the first NPN transistor, wherein the first input circuit comprises a base element of the first NPN transistor and wherein said first NPN transistor further comprises a grounded collector element.

9. An attenuator, as claimed in claim 8, wherein the second switching means comprises a second NPN transistor, wherein the second output circuit comprises an emitter element of the second NPN transistor, wherein the second input circuit comprises a base element of the second NPN transistor and wherein the second NPN transistor further comprises a grounded collector element.

* * * * *